G. R. ROMPF.
AUTOMOBILE LOCKING DEVICE.
APPLICATION FILED SEPT. 30, 1916.
1,219,488.
Patented Mar. 20, 1917.
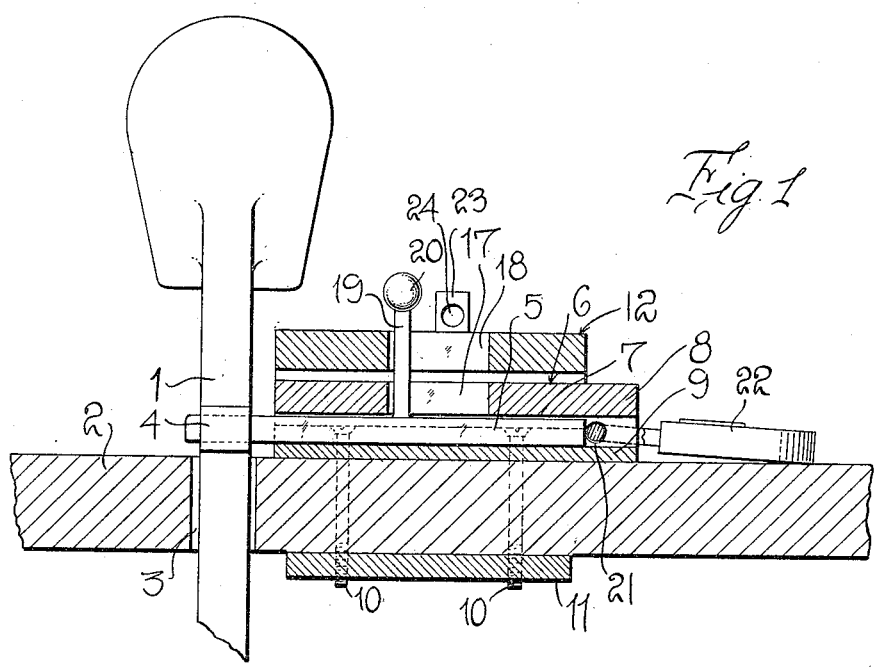
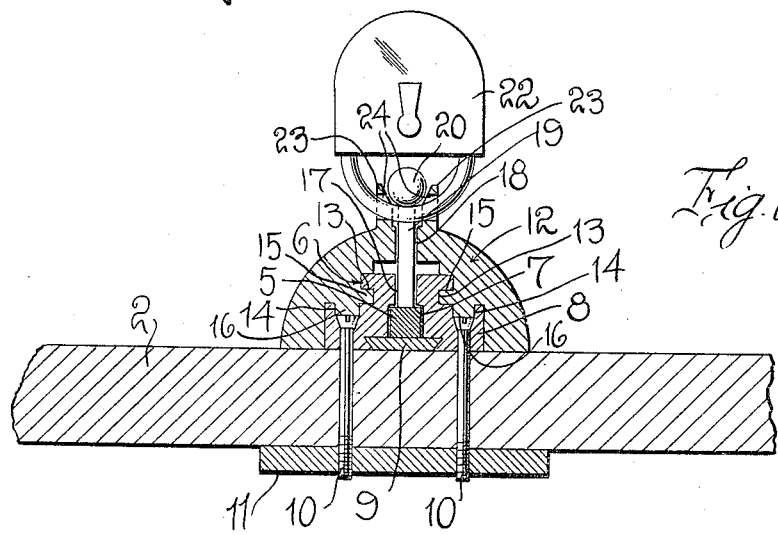
Inventor
GEORGE R. ROMPF
By Watson E. Coleman
Attorney

UNITED STATES PATENT OFFICE.

GEORGE R. ROMPF, OF SOMONAUK, ILLINOIS.

AUTOMOBILE-LOCKING DEVICE.

1,219,488.  Specification of Letters Patent.  Patented Mar. 20, 1917.

Application filed September 30, 1916. Serial No. 123,107.

*To all whom it may concern:*

Be it known that I, GEORGE R. ROMPF, a citizen of the United States, residing at Somonauk, in the county of Dekalb and State of Illinois, have invented certain new and useful Improvements in Automobile-Locking Devices, of which the following is a specification, reference being had to the accompanying drawings.

This invention comprehends certain new and useful improvements in devices for locking automobiles to prevent them from being surreptitiously taken and operated, and the invention has for its primary object a practical, durable, and efficient device of this character, the parts of which may be very easily manufactured and readily assembled, and not liable to get out of order or require any attention after being applied to the vehicle, the device being so formed that it will be applicable for use in connection with practically every type or make of motor vehicle, and without the necessity of making any material changes or alterations therein.

A further object of the invention is a device of this kind which is designed to hold the clutch pedal or lever in its "down" or released position, whereby so long as the pedal or lever is thus locked, it will be impossible to operate the car, owing to the fact that the engine or motor cannot be coupled to the transmission gearing.

A still further object of the invention is an improved automobile lock which is so constructed that after it is applied to the floor-board and secured thereto in operative position, it is impossible to remove the fastening devices while the device is in locked position, the parts being so formed that the padlock used in connection therewith will serve the double function of holding the locking pin in operative engagement with the clutch pedal or lever and at the same time hold the parts of the device in assembled relation to each other where the fastening bolts will be inaccessible for the purpose of detachment.

The invention has for still another object an improved device of this character in which the parts are so formed and arranged that the padlock above mentioned may also be conveniently used to hold the locking pin in its inoperative position where there will be no danger of its accidental moving into engagement with the clutch pedal or lever, this feature of the invention also providing means whereby the padlock may be conveniently carried and be always at hand and not be liable to become lost.

And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which—

Figure 1 is a longitudinal sectional view of an automobile locking device embodying the improvements of my invention, and Fig. 2 is a transverse sectional view thereof.

Corresponding and like parts are referred to in the following description and designated in all of the views of the accompanying drawing by like reference characters.

Referring to the drawing, the numeral 1 designates the clutch pedal or lever of an automobile, and 2 the floor-board thereof, provided with the usual slot 3 to permit the clutch lever 1 to have its customary movements.

In carrying out my invention, I form the clutch lever 1, in the stem or shank portion thereof, with an opening 4 extending therethrough and of any desired shape, and I provide a locking pin 5 designed to extend into or through the keeper or opening 4, for the purpose of holding the clutch lever 1 in its inoperative or released position. The locking pin 5 is movable within a casing 6 which is formed with a longitudinally extending opening 7 for the accommodation of the pin 5, said casing being preferably constructed in two sections, designated 8 and 9 respectively, whereby the opening 7 may be more easily manufactured. The section or block 8 of the casing 6 is secured to the floor-board 2 by screw bolts 10, or similar fastening devices, said screw bolts extending through the floor-board 2 and preferably also through a plate 11, applied to the lower face of the floor-board; and a guard or housing 12 is adapted to be slipped over and above the casing 6, to cover the fastening devices 10 so as to prevent the detachment thereof, the block 8 of the casing 6 being formed with longitudinally extending grooves 13 and 14, designed for interlocking engagement with longitudinal ribs 15 and 16 formed in the housing 12, as clearly illustrated in the drawing.

The casing 6 is formed with a longitudinal opening 17 and the housing 12 is formed with a corresponding opening 18 registering with the opening 17, the locking pin 5 having formed thereon or secured thereto in any desired way, a perpendicularly disposed handle 19 accommodated by and movable within the openings 17 and 18, whereby the locking pin 5 may be manually operated, said handle being preferably formed on its free extremity with a finger knob 20.

The casing 6 is formed at its outer end, that is, the end farthest from the clutch lever 1, with a transversely extending opening 21, designed to receive the hasp of a padlock 22 or the like, back of the locking pin 5, whereby said pin may be held in its operative position in engagement with the keeper 4 of the clutch lever 1, and it is to be particularly noted that the padlock, when in this position, will not only prevent the retracting of the locking pin 5 from engagement with the clutch lever 1 but will also prevent the housing 12 from being slipped from the casing 6 and thereby will preclude the possibility of obtaining access to the fastening devices 10 for the detachment of the latter. Preferably the housing 12 is formed on opposite sides of its opening 18 with upstanding ears 23 formed with transversely alining apertures 24, whereby the padlock 22 may have its hasp extended through said apertures and locked to the device so that it will not be liable to become lost and will be always at hand, while at the same time in this position of the padlock, it will hold the locking pin 5 in its inoperative and retracted position by extending across the path of movement of the handle 19 and will thus avoid or prevent any accidental movement of the locking pin toward its operative position.

From the foregoing description in connection with the accompanying drawing, the operation of my improved locking device will be apparent. In the practical use of the device, after the parts have been secured in place, as hereinbefore described, if it is desired to lock the automobile, the clutch pedal or lever is moved to its release position, the locking pin 5 is moved forward into operative relation and engagement with the keeper 4, and the padlock 22 is locked with its hasp in the transverse opening 21 back of the locking pin whereby it will be impossible to move the clutch lever to its operative position and to connect the motor with the transmission mechanism.

While the accompanying drawing illustrates what I believe to be the preferred embodiment of the invention, it is to be understood that the invention is not limited thereto, but that various changes may be made in the construction, arrangements and proportions of the parts without departing from the scope of the invention as defined in the appended claims.

What is claimed, is:

1. A locking device including a casing, a locking pin movable therein, fastening means engageable with the casing and adapted to secure same to a support, and a housing adapted to be slipped upon the casing over said fastening means, the casing being provided with means for engagement by the hasp of a padlock whereby the latter will serve to prevent the retraction of the locking pin, and the removal of the housing.

2. A locking device including a casing, a locking pin movable therein, fastening devices engageable with the casing and adapted to secure same to a support, and a housing adapted to be slipped upon the casing over the fastening devices, the casing being formed back of said housing and back of said locking pin in its projected position with an opening designed to receive the hasp of a padlock whereby the latter will serve to prevent the retraction of the locking pin and the removal of the housing.

3. A locking device comprising a casing, a locking pin movable therein, fastening devices extending through the casing and adapted to secure same to a support, and a housing adapted to be slipped upon the casing and formed with longitudinally extending ribs, the casing being formed with longitudinal grooves with which the ribs are designed to interlock, the casing being formed with a transversely extending opening back of the locking pin in the projected position of the latter, designed to receive the hasp of a padlock for holding the pin in projected position and for preventing the removal of the housing.

4. A locking device comprising a casing, a locking pin movable therein, a housing adapted to be slipped upon the casing, for the purpose specified, the casing and housing being formed with registering openings and the locking pin being provided with a handle engageable in and through said openings, the casing being formed back of the housing with transverse openings designed to receive the hasp of a padlock to hold the locking pin in projected position and prevent the removal of the housing, and ears formed on the housing on opposite sides of the opening therein, said ears being formed with transversely alining apertures, as and for the purpose set forth.

In testimony whereof I hereunto affix my signature in the presence of two witnesses.

GEORGE R. ROMPF.

Witnesses:
C. T. CARR,
W. H. NORTON.

Copies of this patent may be obtained for five cents each, by addressing the "Commissioner of Patents, Washington, D. C."